US010977783B1

United States Patent
Jaipuria et al.

(10) Patent No.: US 10,977,783 B1
(45) Date of Patent: Apr. 13, 2021

(54) QUANTIFYING PHOTOREALISM IN SIMULATED DATA WITH GANS

(71) Applicant: Ford Global Technologies, LLC, Dearborn, MI (US)

(72) Inventors: Nikita Jaipuria, Union City, CA (US); Gautham Sholingar, Sunnyvale, CA (US); Vidya Nariyambut Murali, Sunnyvale, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/653,182

(22) Filed: Oct. 15, 2019

(51) Int. Cl.
| | |
|---|---|
| *G06T 7/00* | (2017.01) |
| *G06K 9/62* | (2006.01) |
| *G06N 3/04* | (2006.01) |
| *G06N 3/08* | (2006.01) |

(52) U.S. Cl.
CPC .......... *G06T 7/0002* (2013.01); *G06K 9/6256* (2013.01); *G06K 9/6262* (2013.01); *G06N 3/0454* (2013.01); *G06N 3/08* (2013.01); *G06T 2207/20081* (2013.01); *G06T 2207/20084* (2013.01); *G06T 2207/30168* (2013.01)

(58) Field of Classification Search
None
See application file for complete search history.

(56) References Cited

U.S. PATENT DOCUMENTS

| | | |
|---|---|---|
| 10,262,236 B2 | 4/2019 | Lim et al. |
| 2018/0286055 A1 | 10/2018 | Lim et al. |
| 2018/0293734 A1 | 10/2018 | Lim et al. |
| 2019/0147582 A1* | 5/2019 | Lee .......... G06T 11/00 382/156 |
| 2019/0251612 A1* | 8/2019 | Fang ........... G06N 3/08 |
| 2019/0286938 A1* | 9/2019 | Backhus ........... G06T 15/08 |
| 2020/0026416 A1* | 1/2020 | Bala .......... G06N 3/088 |
| 2020/0380652 A1* | 12/2020 | Olaleye .......... G06T 3/60 |

OTHER PUBLICATIONS

James Vincent, "Nvidia Has Created The First Video Game Demo Using AI-Generated Graphics", The Verge, Dec. 3, 2018, retrieved from Internet URL: https://www.theverge.com/2018/12/3/18121198/ai-generated-video-game-graphics-nvidia-driving-demo-neurips (5 pages).

* cited by examiner

*Primary Examiner* — David Perlman
(74) *Attorney, Agent, or Firm* — Frank A. MacKenzie; Bejin Bieneman PLC (57) ABSTRACT

The present disclosure discloses a system and a method. In an example implementation, the system and the method can receive a synthetic image at a first deep neural network, and determine, via the first deep neural network, a prediction indicative of whether the synthetic image is machine-generated or is sourced from the real data distribution. The prediction can comprise a quantitative measure of photorealism of synthetic image.

20 Claims, 7 Drawing Sheets

FIG. 7

QUANTIFYING PHOTOREALISM IN SIMULATED DATA WITH GANS

BACKGROUND

Deep neural networks (DNNs) can be used to perform many image understanding tasks, including classification, segmentation, and captioning. Typically, DNNs require large amounts of training images (tens of thousands to millions). Additionally, these training images typically need to be annotated for the purposes of training and prediction.

DETAILED DESCRIPTION

A system comprises a computer including a processor and a memory, and the memory including instructions such that the processor is programmed to receive a synthetic image at a first deep neural network; and determine, via the first deep neural network, a prediction indicative of whether the synthetic image is machine-generated or is sourced from the real data distribution, wherein the prediction comprises a quantitative measure of photorealism of synthetic image.

In other features, the quantitative measure of the photorealism indicates how close the synthetic image corresponds to an image from the real data distribution.

In other features, the synthetic image depicts a plurality of objects.

In other features, the synthetic image depicts the plurality of objects corresponding to an image view of a simulated image.

In other features, the simulated image is generated by an image generator.

In other features, the image generator comprises a gaming engine.

In other features, the synthetic image is generated via a second deep neural network based on the simulated image.

In other features, the second deep neural network comprises an encoder-decoder neural network and the first deep neural network comprises a convolutional neural network.

In other features, the processor is further programmed to determine that the synthetic image is sourced from the real data distribution when the prediction is greater than or equal to a predetermined threshold.

In other features, the processor is further programed to store the synthetic image in a database when the prediction is greater than or equal to the predetermined threshold.

A method comprises receiving a synthetic image at a first deep neural network; and determining, via the first deep neural network, a prediction indicative of whether the synthetic image is machine-generated or is sourced from the real data distribution, wherein the prediction comprises a quantitative measure of photorealism of synthetic image.

In other features, the quantitative measure of the photorealism indicates how close the synthetic image corresponds to an image from the real data distribution.

In other features, the synthetic image depicts a plurality of objects.

In other features, the synthetic image depicts the plurality of objects corresponding to an image view of a simulated image.

In other features, the simulated image is generated by an image generator.

In other features, the image generator comprises a gaming engine.

In other features, the synthetic image is generated via a second deep neural network based on the simulated image.

In other features, the second deep neural network comprises an encoder-decoder neural network and the first deep neural network comprises a convolutional neural network.

In other features, the method includes determining that the synthetic image is sourced from the real data distribution when the prediction is greater than or equal to a predetermined threshold.

In other features, the method includes storing the synthetic image in a database when the prediction is greater than or equal to the predetermined threshold.

Autonomous vehicles typically employ perception algorithms, or agents, to perceive the environment around the vehicle. However, training the perception algorithms typically requires large amounts of data. Gaming engines can be used to simulate data, such as synthetic images, that depict objects of interest to the perception algorithms. The objects of interest may include other vehicles, trailers, pedestrians, street markings, signs, or the like. However, the synthetic data may not appear "real." As a result, the training of perception algorithms using synthetic data may not correspond to the training of perception algorithms using real, i.e., non-generated, data.

In some instances, generative adversarial networks (GANs) are used to transform simulated data such that the simulated data appears more photorealistic. Additionally, the photorealism of simulated images may vary from person to person. As such, there may be no standard process to evaluate the photorealism of a simulated image. Additionally, simulated images may fail to account for nuances within the real world, such as lighting, particle physics, material textures, and/or overall appearances.

The present disclosure discloses an adversarial neural network that trains a discriminator to evaluate the photorealism of simulated images. The adversarial network can include a generator that generates simulated images and a discriminator that evaluates the simulated images. Based on the evaluation, the discriminator and/or the generator may be updated such that the generator can generate more realistic simulated images and the discriminator can minimize incorrect evaluations.

While the present disclosure describes a vehicle system and a server, it is understood that any suitable computer system may be used to perform the techniques and/or the functionality of the adversarial neural network described herein. Additionally, the techniques described herein may including training a generator for image generating purposes, which can result in improved processing efficiencies within vehicle systems.

Figure 1:
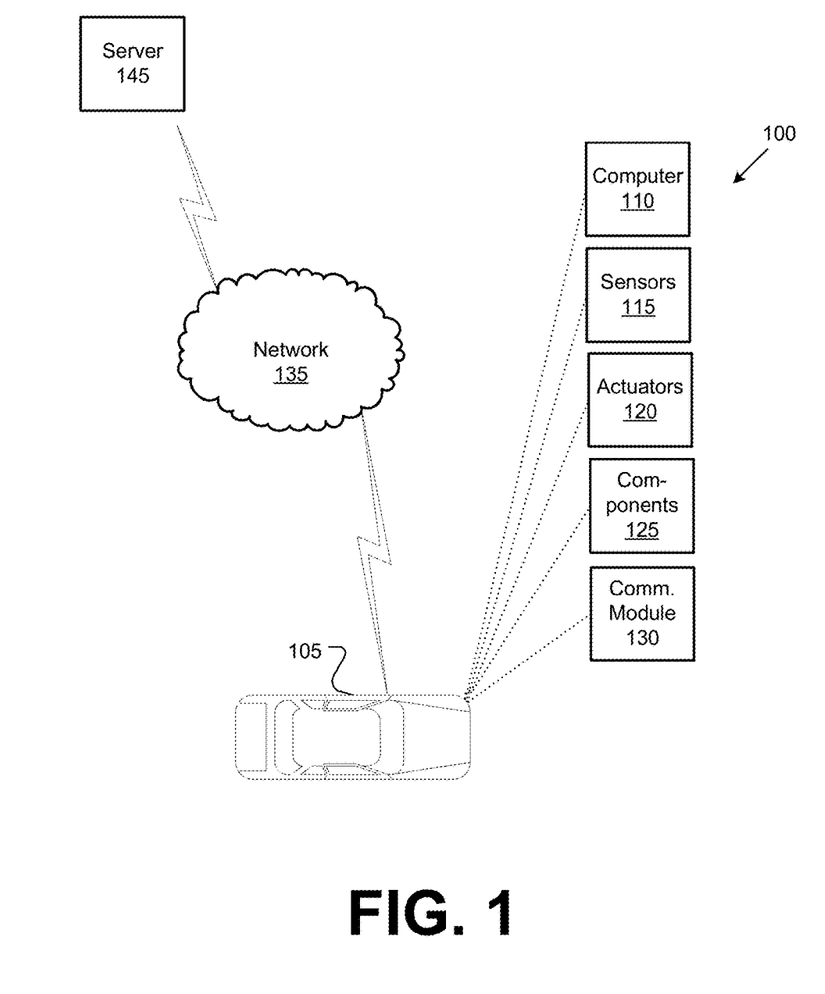
FIG. 1 is a diagram of an example system for training an adversarial network.

FIG. 1 is a block diagram of an example vehicle system 100. The system 100 includes a vehicle 105, which is a land vehicle such as a car, truck, etc. The vehicle 105 includes a computer 110, vehicle sensors 115, actuators 120 to actuate various vehicle components 125, and a vehicle communications module 130. Via a network 135, the communications module 130 allows the computer 110 to communicate with a server 145.

The computer 110 includes a processor and a memory. The memory includes one or more forms of computer-readable media, and stores instructions executable by the computer 110 for performing various operations, including as disclosed herein.

The computer 110 may operate a vehicle 105 in an autonomous, a semi-autonomous mode, or a non-autonomous (manual) mode. For purposes of this disclosure, an autonomous mode is defined as one in which each of vehicle 105 propulsion, braking, and steering are controlled by the computer 110; in a semi-autonomous mode the computer 110 controls one or two of vehicles 105 propulsion, braking, and steering; in a non-autonomous mode a human operator controls each of vehicle 105 propulsion, braking, and steering.

The computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via the vehicle 105 communications module 130 as described further below, more than one processor, e.g., included in electronic controller units (ECUs) or the like included in the vehicle 105 for monitoring and/or controlling various vehicle components 125, e.g., a powertrain controller, a brake controller, a steering controller, etc. Further, the computer 110 may communicate, via the vehicle 105 communications module 130, with a navigation system that uses the Global Position System (GPS). As an example, the computer 110 may request and receive location data of the vehicle 105. The location data may be in a known form, e.g., geo-coordinates (latitudinal and longitudinal coordinates).

The computer 110 is generally arranged for communications on the vehicle 105 communications module 130 and also with a vehicle 105 internal wired and/or wireless network, e.g., a bus or the like in the vehicle 105 such as a controller area network (CAN) or the like, and/or other wired and/or wireless mechanisms.

Via the vehicle 105 communications network, the computer 110 may transmit messages to various devices in the vehicle 105 and/or receive messages from the various devices, e.g., vehicle sensors 115, actuators 120, vehicle components 125, a human machine interface (HMI), etc. Alternatively or additionally, in cases where the computer 110 actually comprises a plurality of devices, the vehicle 105 communications network may be used for communications between devices represented as the computer 110 in this disclosure. Further, as mentioned below, various controllers and/or vehicle sensors 115 may provide data to the computer 110.

Vehicle sensors 115 may include a variety of devices such as are known to provide data to the computer 110. For example, the vehicle sensors 115 may include Light Detection and Ranging (lidar) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide and range velocity of objects (possibly including second vehicles 106), etc., relative to the location of the vehicle 105. The vehicle sensors 115 may further include camera sensor(s) 115, e.g. front view, side view, rear view, etc., providing images from a field of view inside and/or outside the vehicle 105.

The vehicle 105 actuators 120 are implemented via circuits, chips, motors, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module or interface 130 with devices outside of the vehicle 105, e.g., through a vehicle-to-vehicle (V2V) or vehicle-to-infrastructure (V2X) wireless communications to another vehicle, to (typically via the network 135) a remote server 145. The module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 include cellular, Bluetooth®, IEEE 802.11, dedicated short range communications (DSRC), and/or wide area networks (WAN), including the Internet, providing data communication services.

The network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short-Range Communications (DSRC), etc.), local area networks (LAN)

and/or wide area networks (WAN), including the Internet, providing data communication services.

A computer 110 can receive and analyze data from sensors 115 substantially continuously, periodically, and/or when instructed by a server 145, etc. Further, object classification or identification techniques can be used, e.g., in a computer 110 based on lidar sensor 115, camera sensor 115, etc., data, to identify a type of object, e.g., vehicle, person, rock, pothole, bicycle, motorcycle, etc., as well as physical features of objects.

Figure 2:
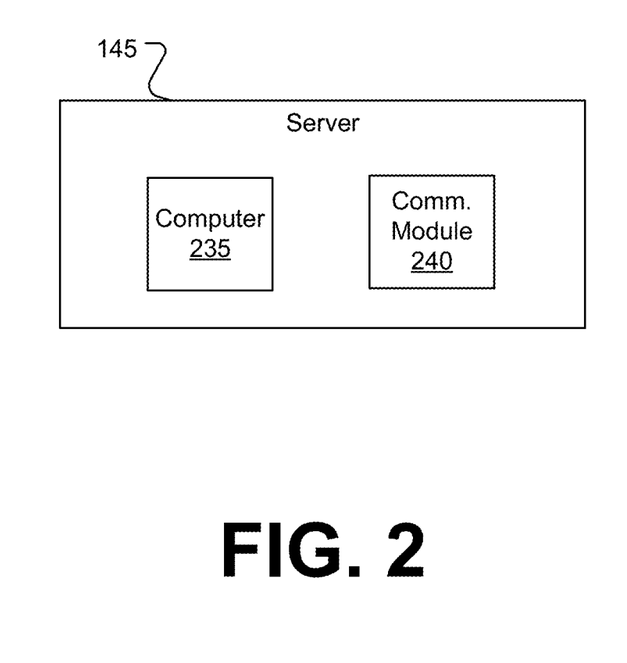
FIG. 2 is a diagram of an example server within the system.

FIG. 2 is a block diagram of an example server 145. The server 145 includes a computer 235 and a communications module 240. The computer 235 includes a processor and a memory. The memory includes one or more forms of computer-readable media, and stores instructions executable by the computer 235 for performing various operations, including as disclosed herein. The communications module 240 allows the computer 235 to communicate with other devices, such as the vehicle 105.

Figure 3A:
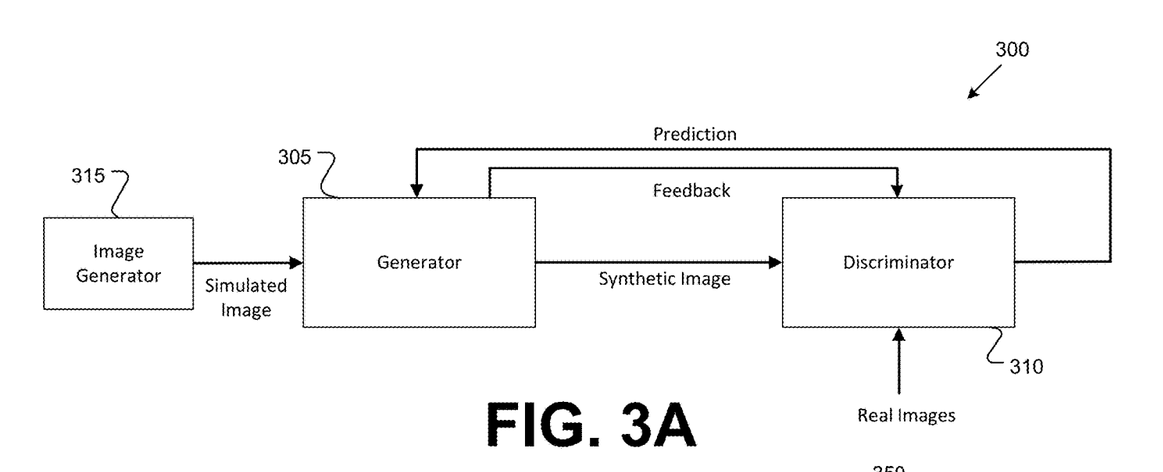
FIG. 3A is a diagram of an example adversarial network.
Figure 3B:
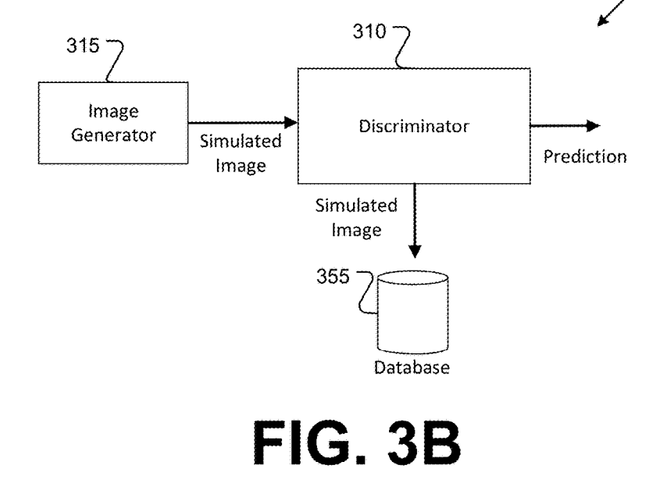
FIG. 3B is a diagram of a trained discriminator

FIG. 3A is a diagram of an example adversarial neural network 300, and FIG. 3B is a diagram of an example trained discriminator system 350. The adversarial neural network 300 can be a software program that can be loaded in memory and executed by a processor in the vehicle 105 and/or the server 145, for example. As shown, the adversarial neural network 300 includes a generator 305 and a discriminator 310. Within the present context, the generator 305 and the discriminator 310 comprise a generative adversarial network (GAN). The GAN is a deep neural network that employs a class of artificial intelligence algorithms used in machine learning and implemented by a system of two neural networks contesting each other in an adversarial zero-sum game framework.

Figure 4A:
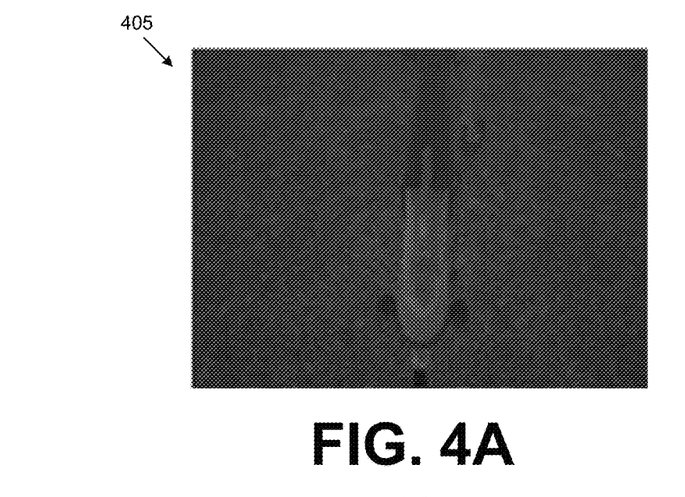
FIG. 4A is an example simulated image generated by a generator of the adversarial network.
Figure 4B:
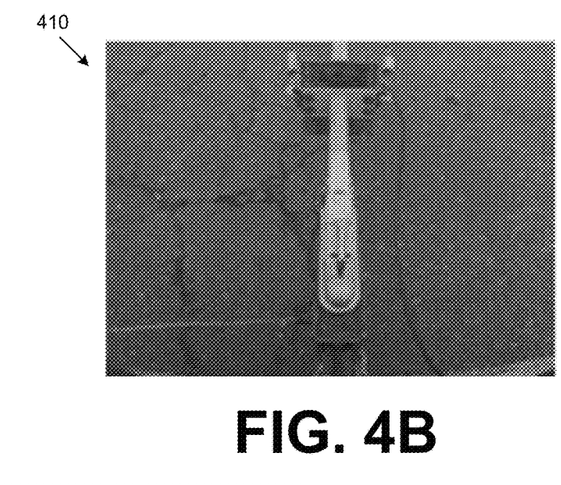
FIG. 4B is an example image from a real data distribution corresponding to the simulated image of FIG. 4A.

In an example implementation, the generator 305 receives a synthetic input image. The synthetic input image can be generated by a synthetic image generator 315. In an example implementation, the image generator 315 comprises a gaming engine. The input images may correspond based on the objects, image views, and/or parameters of the objects depicted in the images. For example, if the synthetic input image is a plan view of a vehicle trailer, the corresponding input image is plan view of a vehicle trailer. FIG. 4A is a plan view of a vehicle trailer 405 generated by a gaming engine, and FIG. 4B is a plan view of a vehicle trailer 410 selected from a real data distribution.

Figure 4C:
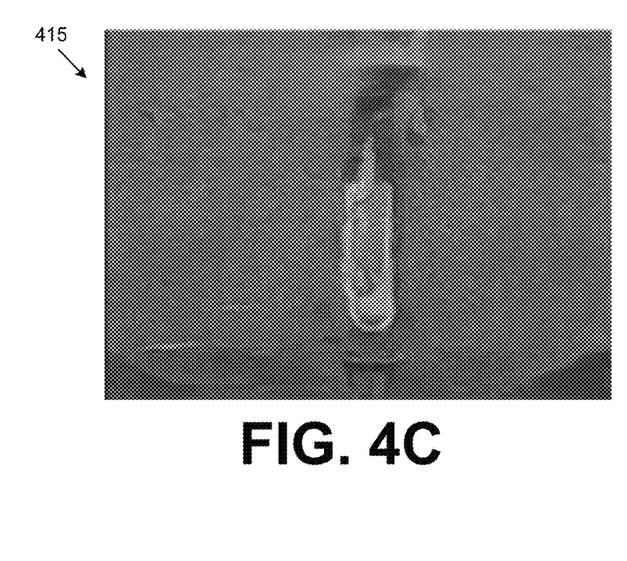
FIG. 4C is an example synthetic image generated by a generator of the adversarial network.

The generator 305 generates a synthetic image based on the synthetic input image. For instance, the generator 305 receives a simulated red-green-blue (RGB) image including one or more features or objects depicted in the input images. Within the present context, the synthetic image may be an image-to-image translation of the simulated image, e.g., the input image is translated from one domain (simulation) to another domain (real). FIG. 4C is plan view of a vehicle trailer 415 generated by the generator 305 based on the input image. In one or more implementations, the generator 305 may comprise an encoder-decoder neural network. However, it is understood that other neural networks may be used in accordance with the present disclosure.

The discriminator 310 is configured to receive an image, evaluate the received image, and generate a prediction indicative of whether the received image is machine-generated by the generator 305 or is sourced from a real data distribution. The discriminator 310 receives synthetic images generated by the generator 305 and images from a real data distribution during training such that the discriminator 310 can distinguish between synthetic images and images from a real data distribution. In one or more implementations, the discriminator 310 may comprise a convolutional neural network. However, it is understood that other neural networks may be used in accordance with the present disclosure.

The training of the generator 305 may use reinforcement learning to train the generative model. Reinforcement learning is a type of dynamic programming that trains algorithms using a system of reward and punishment. A reinforcement learning algorithm, or reinforcement learning agent, learns by interacting with its environment. The agent receives rewards by performing correctly and penalties for performing incorrectly. For instance, the reinforcement learning agent learns without intervention from a human by maximizing the reward and minimizing the penalty.

As shown in FIG. 3A, the prediction is provided to the generator 305. The generator 305 can use the prediction to modify, i.e., update, one or more weights of the generator 305 to minimize the predictions indicating the generated synthetic image is classified as synthetic, i.e., fake. For example, the generator 305 may update one or more weights within the generator 305 using backpropagation, or the like.

The discriminator 310 can also be updated based on the prediction. For example, if the prediction indicates the generated synthetic image is from a real data distribution, the discriminator 310 may receive feedback indicating the image is a synthetic image. Based on the feedback, one or more weights of the generator 305 can be updated to minimize incorrect predictions. Through the training process, the generator 305 can improve the quality of synthetic images generated, e.g., generate more realistic synthetic images, and the discriminator 310 can improve identification of nuances and characteristics of synthetically generated images.

Referring to FIG. 3B, the trained discriminator system 350 includes a trained discriminator 310. In an example implementation, the trained discriminator 310 comprises the discriminator 310 trained within the adversarial network 300 after multiple iterations. The trained discriminator 310 is configured to receive a synthetically generated image from an image generator 315 and generates a probability that the received image is from the real data distribution or is machine-generated. If the trained discriminator 310 determines the simulated image is from the real data distribution, the simulated image can be stored in a memory accessible by the server 145. For example, the simulated image may be stored in a database 355.

In one or more implementations, the discriminator 310 is trained to output a probability of the input image being real, which is denoted as $P(x)$. During training, the discriminator's 310 loss function is such that it moves $P(x) \rightarrow 0$ for generated synthetic images and $P(x) \rightarrow 1$ for real images that the discriminator receives during training over the course of the training process. When $P(x)$ is equal to or greater than 0.5 on an average for generated synthetic images, the training process is considered to have converged since the probability indicates that the discriminator 310 is consistently unsure of whether or not the generated synthetic image is real. Within this context, the $P(x)$ is a quantitative measure of photorealism of synthetic image. Photorealism may be a parameter indicative of how close a synthetic image corresponds to an image from a real data distribution.

Figure 5:
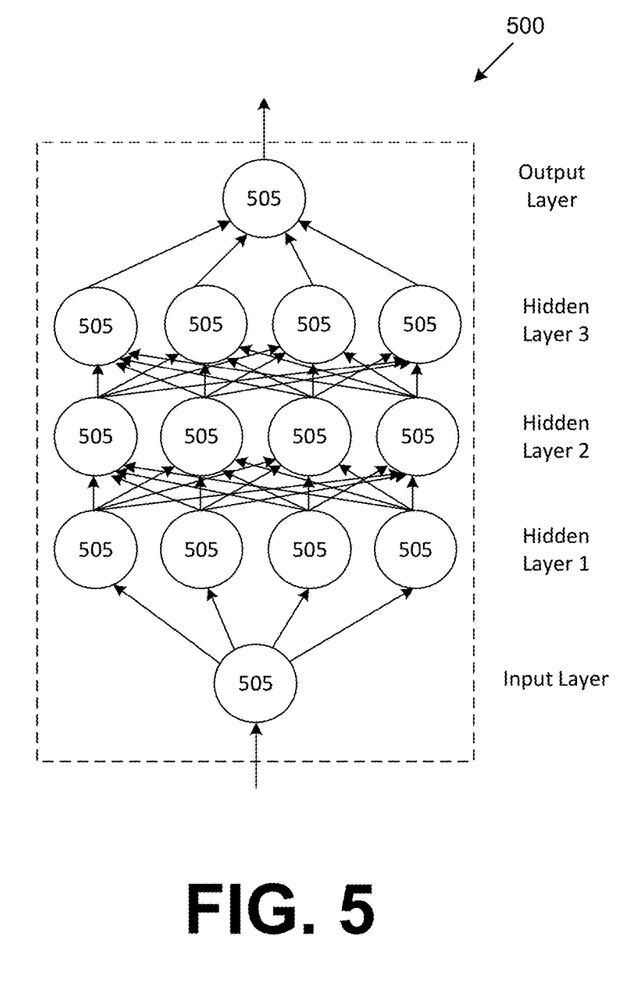
FIG. 5 is a diagram of an example deep neural network.
Figure 6:
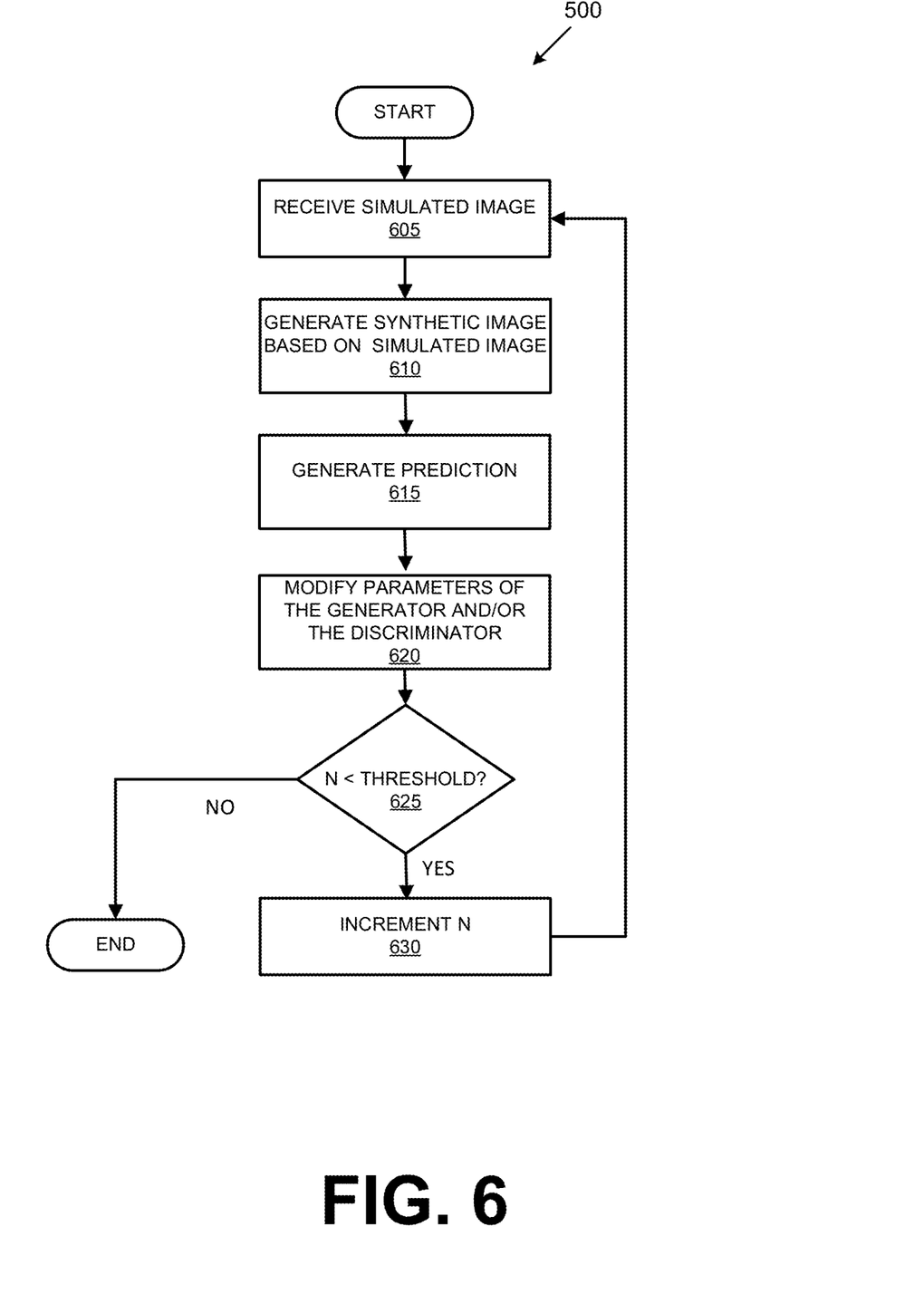
FIG. 6 is a flow diagram illustrating an example process for training an adversarial network.

FIG. 5 is a diagram of an example deep neural network (DNN) 500. The DNN 500 may be representative of the generator 305 and/or the discriminator 310 described above. The DNN 500 includes multiple nodes 505, and the nodes 505 are arranged so that the DNN 500 includes an input layer, one or more hidden layers, and an output layer. Each layer of the DNN 500 can include a plurality of nodes 505. While FIG. 6 illustrates three (3) hidden layers, it is understood that the DNN 500 can include additional or fewer hidden layers. The input and output layers may also include more than one (1) node 505.

The nodes 505 are sometimes referred to as artificial neurons 505, because they are designed to emulate biological, e.g., human, neurons. A set of inputs (represented by the arrows) to each neuron 505 are each multiplied by respective weights. The weighted inputs can then be summed in an input function to provide, possibly adjusted by a bias, a net input. The net input can then be provided to activation function, which in turn provides a connected neuron 505 an output. The activation function can be a variety of suitable functions, typically selected based on empirical analysis. As illustrated by the arrows in FIG. 6, neuron 505 outputs can then be provided for inclusion in a set of inputs to one or more neurons 505 in a next layer.

The DNN 500 can be trained to accept data as input and generate an output based on the input. The DNN 500 can be trained with ground truth data, i.e., data about a real-world condition or state. For example, the DNN 500 can be trained with ground truth data or updated with additional data by a processor. Weights can be initialized by using a Gaussian distribution, for example, and a bias for each node 505 can be set to zero. Training the DNN 500 can including updating weights and biases via suitable techniques such as backpropagation with optimizations. Ground truth data can include, but is not limited to, data specifying objects within an image or data specifying a physical parameter, e.g., angle, speed, distance, or angle of object relative to another object. For example, the ground truth data may be data representing objects and object labels.

FIG. 6 is a flowchart of an exemplary process 600 for training a discriminator within an adversarial neural network. Blocks of the process 600 can be executed by the computer 110 or the computer 235. The process 600 begins at block 605 in which a simulated image is received. In an example implementation, the generator 305 receives a simulated input image from an image generator 315. At block 610, the generator 305 generates a synthetic image, e.g., machine-generated image, based on the simulated input image. In one or more implementations, the generator 305 attempts to generate a photorealistic synthetic image based on the received simulated image.

At block 615, the discriminator 310 generates a prediction indicative of whether the received synthetic image is from the real data distribution or machine-generated. It is understood that the discriminator 310 may have initially been provided images from the real data distribution for training purposes. At block 620, parameters of the discriminator 310 and/or the generator 305 are modified based on the prediction and/or feedback. For example, one or more weights of the generator 305 and/or the discriminator 310 are updated using backpropagation based on the prediction provided to the generator 305 and/or the feedback provided to the discriminator 310.

At block 625, a determination whether a counter N is less than a predetermined training threshold. If the counter N is less than the predetermined training threshold, the counter N is incremented at block 630 and the process 600 returns to block 605 to further train the discriminator 310. Otherwise, the process 600 ends. The predetermined training threshold may be selected based on empirical analysis associated with the training of adversarial networks.

Figure 7:
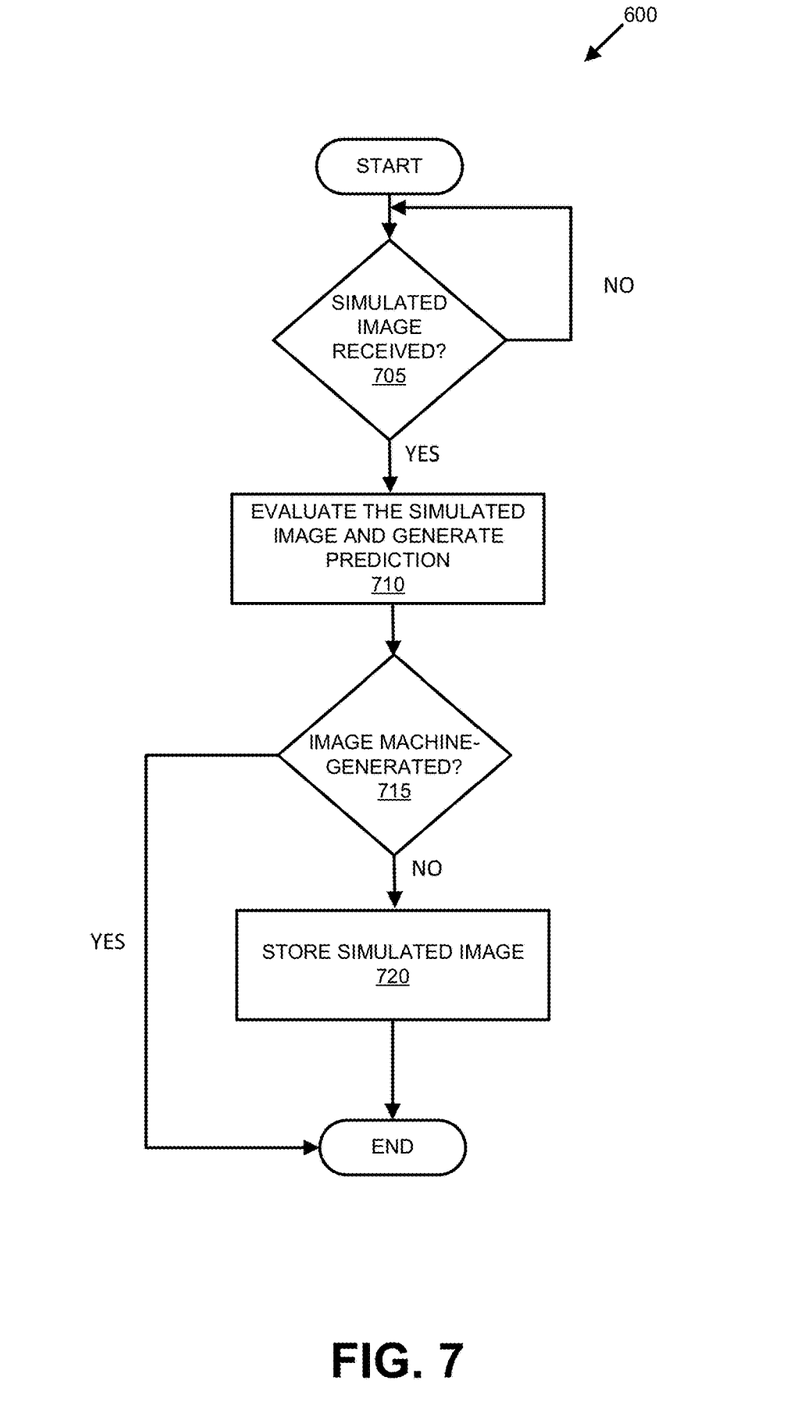
FIG. 7 is a flow diagram illustrating an example process for generating a prediction indicating whether an image is sourced from a real data distribution or is machine-generated.

FIG. 7 is a flowchart of an exemplary process 700 for generating a prediction indicative of whether an image is machine-generated. Blocks of the process 700 can be executed by the computer 110 or the computer 235. The process 700 begins at block 705 in which a determination of whether an image is received. In an example implementation, the trained discriminator 310 determines whether a simulated image has been received from the image generator 315. If no image is received, the process 700 returns to block 705.

Otherwise, at block 710, the trained discriminator 310 evaluates the received image and generates a prediction, i.e., probability, based on the received image. For example, the trained discriminator 310 applies one or more convolutional neural network techniques to the received image to generate a probability that the evaluated image is machine-generated or from a real data distribution. At block 715, a determination is made whether the received image is synthetic, e.g., machine-generated. For example, if the probability, e.g., P(x), is greater than a predetermined threshold, e.g., greater than or equal to 0.5, the discriminator 310 determines that the image is from a real data distribution.

If the determination is that the received image is determined to be synthetic, the process 700 ends. Otherwise, if the determination is that the received image is determined to be from a real data distribution, the simulated image is stored at block 720. For instance, when the discriminator 310 generates a prediction indicating that the simulated image is from a real data distribution, e.g., not machine-generated, the simulated image can be stored in the database 355 for later training. The prediction can represent a quantitative measure of photorealism of the simulated image and can be used to train other neural networks.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system comprising a computer including a processor and a memory, the memory including instructions such that the processor is programmed to:
   receive a synthetic image at a first deep neural network; and
   determine, via the first deep neural network, a prediction indicative of whether the synthetic image is machine-generated or is sourced from a real data distribution;
   wherein the prediction is used as feedback to a generator included in the first deep neural network to train the generator and then communicated from the generator to a discriminator included in the first deep neural network to update the discriminator training; and
   wherein the prediction comprises a quantitative measure of photorealism of synthetic image.

2. The system of claim 1, wherein the quantitative measure of the photorealism indicates how close the synthetic image corresponds to an image from the real data distribution.

3. The system of claim 1, wherein the synthetic image depicts a plurality of objects.

4. The system of claim 3, wherein the synthetic image depicts the plurality of objects corresponding to an image view of a simulated image.

5. The system of claim 4, wherein the simulated image is generated by an image generator.

6. The system of claim 5, wherein the image generator comprises a gaming engine.

7. The system of claim 4, wherein the synthetic image is generated via a second deep neural network based on the simulated image.

8. The system of claim 7, wherein the second deep neural network comprises an encoder-decoder neural network and the first deep neural network comprises a convolutional neural network.

9. The system of claim 1, wherein the processor is further programmed to:
   determine that the synthetic image is sourced from the real data distribution when the prediction is greater than or equal to a predetermined threshold.

10. The system of claim 9, wherein the processor is further programmed to:
    store the synthetic image in a database when the prediction is greater than or equal to the predetermined threshold.

11. A method comprising:
  receiving a synthetic image at a first deep neural network; and
  determining, via the first deep neural network, a prediction indicative of whether the synthetic image is machine-generated or is sourced from a real data distribution;
  wherein the prediction is used as feedback to a generator included in the first deep neural network to train the generator and then communicated from the generator to a discriminator included in the first deep neural network to update the discriminator training; and
  wherein the prediction comprises a quantitative measure of photorealism of synthetic image.

12. The method of claim 11, wherein the quantitative measure of the photorealism indicates how close the synthetic image corresponds to an image from the real data distribution.

13. The method of claim 11, wherein the synthetic image depicts a plurality of objects.

14. The method of claim 13, wherein the synthetic image depicts the plurality of objects corresponding to an image view of a simulated image.

15. The method of claim 14, wherein the simulated image is generated by an image generator.

16. The method of claim 15, wherein the image generator comprises a gaming engine.

17. The method of claim 13, wherein the synthetic image is generated via a second deep neural network based on the simulated image.

18. The method of claim 17, wherein the second deep neural network comprises an encoder-decoder neural network and the first deep neural network comprises a convolutional neural network.

19. The method of claim 18, further comprising:
  determining that the synthetic image is sourced from the real data distribution when the prediction is greater than or equal to a predetermined threshold.

20. The method of claim 19, further comprising:
  storing the synthetic image in a database when the prediction is greater than or equal to the predetermined threshold.

* * * * *